US012003928B2

(12) United States Patent
Calisi et al.

(10) Patent No.: US 12,003,928 B2
(45) Date of Patent: *Jun. 4, 2024

(54) ACOUSTIC MONITORING USING A SOUND MASKING EMITTER AS A SENSOR

(71) Applicant: Biamp Systems, LLC, Beaverton, OR (US)

(72) Inventors: Christopher Calisi, Middleton, MA (US); Faruk Bursal, Waltham, MA (US); Robert Fleming, Lynnfield, MA (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,153

(22) Filed: Feb. 14, 2023

(65) Prior Publication Data

US 2023/0199415 A1 Jun. 22, 2023

Related U.S. Application Data

(63) Continuation of application No. 17/404,920, filed on Aug. 17, 2021, now Pat. No. 11,582,570, which is a continuation of application No. 16/658,027, filed on Oct. 19, 2019, now Pat. No. 11,102,599.

(60) Provisional application No. 62/747,794, filed on Oct. 19, 2018.

(51) Int. Cl.

| | |
|---|---|
| ***G10K 11/16*** | (2006.01) |
| ***G10K 11/175*** | (2006.01) |
| ***H04R 1/40*** | (2006.01) |
| ***H04R 3/12*** | (2006.01) |
| ***H04R 5/02*** | (2006.01) |
| ***H04R 5/04*** | (2006.01) |
| ***H04R 29/00*** | (2006.01) |
| ***H04S 3/00*** | (2006.01) |

(52) U.S. Cl.

CPC ......... *H04R 29/002* (2013.01); *G10K 11/175* (2013.01); *G10K 11/1752* (2020.05); *H04R 1/403* (2013.01); *H04R 3/12* (2013.01); *H04R 5/02* (2013.01); *H04R 5/04* (2013.01); *H04S 3/008* (2013.01); *H04S 2400/01* (2013.01)

(58) Field of Classification Search

CPC ...... H04R 1/1083; H04R 3/02; G10K 11/178; G10K 11/17854; H03G 3/32

USPC .................................................. 381/55, 71.1

See application file for complete search history.

(56) References Cited

U.S. PATENT DOCUMENTS

2006/0023870 A1 2/2006 Stenmark
2009/0034748 A1 2/2009 Sibbald
2012/0148060 A1 6/2012 Isberg
2018/0217809 A1 8/2018 Yu et al.
2019/0104362 A1 4/2019 Nakagawa et al.

*Primary Examiner* — George C Monikang

(57) ABSTRACT

Example embodiments may include one or more of receiving an electrical sound emission signal from a sound controller, interrupting reception of the electrical sound emission signal, by a sound emission interruption circuit connected to a sound emitter, and receiving an electrical ambient sound signal via a sound detection circuit, based on ambient sound sensed by the sound emitter when the reception of the electrical sound emission signal is interrupted by the sound emission interruption circuit.

20 Claims, 12 Drawing Sheets

<u>100</u>

100

300

500

600

1000

1100

ACOUSTIC MONITORING USING A SOUND MASKING EMITTER AS A SENSOR

CROSS-REFERENCE TO RELATED APPLICATIONS

This application is a continuation of U.S. patent application Ser. No. 17/404,920, filed on Aug. 17, 2021, now U.S. Pat. No. 11,582,570, issued on Feb. 14, 2023, which is a continuation of U.S. patent application Ser. No. 16/658,027, filed on Oct. 19, 2019, now U.S. Pat. No. 11,102,599, issued on Aug. 24, 2021, which claims priority to earlier filed U.S. provisional application Ser. No. 62/747,794, filed on Oct. 19, 2018, the entire contents of which are hereby incorporated by reference.

BACKGROUND

There is an ongoing need to provide users of sound systems, such as sound masking systems, with an improved understanding of the acoustic environment in which the sound systems are used. In the field of sound masking, for example, in open-plan spaces, there is an ongoing need to improve the ability to make decisions to manage noise levels for increased productivity and privacy.

SUMMARY

In an aspect of the invention, sound emitters, such as sound masking emitters, are themselves used as sensors to monitor an acoustic environment. Periodically, the emitted sound signal, such as the sound masking signal, is turned off, and the ambient sound signal that is detected by the sound emitter's driver is measured. The emitted sound signal can be conditioned to make turning off the emitted sound signal less perceptible by a listener. By using sound emitters themselves as sensors, it is not necessary to deploy separate acoustic sensors in a space, thereby saving cost and avoiding the need to have additional devices in the ceiling in which the sound emitters are deployed. Among other features, the system provides the ability to deliver, to a user, sound pressure levels over time in an acoustic environment, such as an open space, work space environment, etc., for the purpose of understanding noise levels in the acoustic environment.

In one aspect of the invention, a system for sensing an acoustic environment comprises a sound emitter comprising an electrical connection to receive an electrical sound emission signal from a sound controller. A sound emission interruption circuit is connected to interrupt reception of the electrical sound emission signal by the sound emitter. A sound detection circuit is connected to receive an electrical ambient sound signal generated by the sound emitter based on ambient sound sensed by the sound emitter when the reception of the electrical sound emission signal is interrupted by the sound emission interruption circuit.

In further, related aspects, the sound emitter can comprise a sound masking emitter, and the electrical sound emission signal can comprise a sound masking signal. In addition, the sound emitter can comprise an emitter configured to emit sounds comprising music or paging, and the electrical sound emission signal can comprise a music signal or a paging signal. The sound detection circuit can be connected to receive an electrical ambient sound signal generated by a driver of the sound emitter based on the ambient sound. A signal conditioner circuit can be connected to condition the electrical sound emission signal to be received by the sound emitter. The signal conditioner circuit can comprise a ramp circuit.

In other related aspects, the sound controller can be configured to emit a plurality of sound channels of the electrical sound emission signal, and the sound emission interruption circuit can be configured to selectively interrupt reception by the sound emitter of a sound channel of the plurality of sound channels of the electrical sound emission signal. The system can comprise a plurality of signal conditioner circuits corresponding to the plurality of sound channels, and a signal conditioner circuit of the plurality of signal conditioner circuits can be connected to condition the sound channel to be selectively interrupted. The system can further comprise a chain of a plurality of sound emitters comprising the sound emitter, the chain being connected to receive the plurality of sound channels of the electrical sound emission signal, and the sound emitter of the plurality of sound emitters of the chain being configured to emit one sound channel of the plurality of sound channels and to shuffle the plurality of sound channels prior to passing the plurality of sound channels to a next sound emitter in the chain. The system can further comprise an analog to digital converter connected to convert an analog ambient sound signal produced by the sound emitter into a digital signal to comprise at least part of the electrical ambient sound signal to be received by the sound detection circuit. A sound sensor processor can be connected to perform at least one of: calibration of the electrical ambient sound signal, normalization of the electrical ambient sound signal, scaling of the electrical ambient sound signal and one-third octave band decomposition of the electrical ambient sound signal. The sound emitter can comprise a direct field sound masking loudspeaker. The sound emitter can comprise a low directivity index. The sound emitter can comprise a cone loudspeaker.

In further related aspects, the system can further comprise a reporting processor connected to electrically transmit a report of a sound pressure level in the acoustic environment over time based on the electrical ambient sound signal received by the sound detection circuit. The reporting processor can be configured to transmit the report upon the sound pressure level exceeding a sound pressure level target. The reporting processor can be configured to transmit the report based on a user reporting preference.

In another aspect of the invention, a method of sensing an acoustic environment comprises, with a sound emitter, receiving an electrical sound emission signal from a sound controller, interrupting reception of the electrical sound emission signal by the sound emitter, and, while the reception of the electrical sound emission signal is interrupted, detecting an electrical ambient sound signal generated by the sound emitter based on ambient sound sensed by the sound emitter.

In further related aspects, the method can further comprise electrically transmitting a report of a sound pressure level in the acoustic environment over time based on the electrical ambient sound signal received by the sound detection circuit. The report can be transmitted upon the sound pressure level exceeding a sound pressure level target. The report can be transmitted based on a user reporting preference, such as at least one of a system performance preference and a sound pressure level preference. The method can comprise performing sound masking in the acoustic environment using a sound masking signal emitted by the sound controller while simultaneously sensing the acoustic environment using a sound emitter to which the electrical sound emission signal is interrupted. The method can comprise sensing a test tone generated by the sound controller and emitted in an adjacent area to the acoustic environment, while the reception of the electrical sound emission signal is interrupted.

One example embodiment may include a system that includes one or more of a sound controller, a sound emitter having at least one electrical connection to receive an electrical sound emission signal from the sound controller, a sound emission interruption circuit connected to the sound emitter and configured to interrupt reception of the electrical sound emission signal by the sound emitter, and a sound detection circuit connected to the sound emitter via the at least one electrical connection, and the sound detection circuit is configured to receive an electrical ambient sound signal based on ambient sound sensed by the sound emitter when the reception of the electrical sound emission signal is interrupted by the sound emission interruption circuit.

Another example embodiment may include a method that includes one or more of receiving an electrical sound emission signal from a sound controller, interrupting reception of the electrical sound emission signal, by a sound emission interruption circuit connected to a sound emitter, and receiving an electrical ambient sound signal via a sound detection circuit, based on ambient sound sensed by the sound emitter when the reception of the electrical sound emission signal is interrupted by the sound emission interruption circuit.

Another example embodiment may include a non-transitory computer readable storage medium configured to store instructions that when executed cause a processor to perform one or more of receiving an electrical sound emission signal from a sound controller, interrupting reception of the electrical sound emission signal, by a sound emission interruption circuit connected to a sound emitter, and receiving an electrical ambient sound signal via a sound detection circuit, based on ambient sound sensed by the sound emitter when the reception of the electrical sound emission signal is interrupted by the sound emission interruption circuit.

Still another example embodiment may include a system that includes one or more of a plurality of sound emitters configured to receive a plurality of sound emissions signals from a plurality of channels, a plurality of relay circuits configured to control the plurality of sound emission signals, and one of the plurality of relay circuits is configured to interrupt one of the plurality of sound emission signals associated with one of the plurality of sound emitters while the other sound emissions signals pass to the other corresponding plurality of sound emitters, and a sound detection circuit configured to receive an electrical ambient sound signal based on ambient sound sensed by the one of the plurality of sound emitters responsive to the interrupted one of the plurality of sound emission signals.

Still yet a further example embodiment may include a method that includes one or more of receiving a plurality of sound emissions signals from plurality of channels via a plurality of sound emitters, controlling the plurality of sound emission signals, via a plurality of relay circuits, and one of the plurality of relay circuits is configured to interrupt one of the plurality of sound emission signals associated with one of the plurality of sound emitters while the other sound emissions signals pass to the other corresponding plurality of sound emitters, and receiving, via a sound detection circuit, an electrical ambient sound signal based on ambient sound sensed by the one of the plurality of sound emitters responsive to the interrupted one of the plurality of sound emission signals.

Still yet a further example embodiment may include a non-transitory computer readable storage medium configured to store instructions that when executed cause a processor to perform one or more of receiving a plurality of sound emissions signals from a plurality of channels via a plurality of sound emitters, controlling the plurality of sound emission signals, via a plurality of relay circuits, and one of the plurality of relay circuits is configured to interrupt one of the plurality of sound emission signals associated with one of the plurality of sound emitters while the other sound emissions signals pass to the other corresponding plurality of sound emitters, and receiving, via a sound detection circuit, an electrical ambient sound signal based on ambient sound sensed by the one of the plurality of sound emitters responsive to the interrupted one of the plurality of sound emission signals.

BRIEF DESCRIPTION OF THE DRAWINGS

The foregoing will be apparent from the following more particular description of example embodiments, as illustrated in the accompanying drawings. The drawings are not necessarily to scale, emphasis instead being placed upon illustrating embodiments.

DETAILED DESCRIPTION

According to example embodiments, sound emitters, such as sound masking emitters, are used to emit sound and may also be used as sensors to monitor an acoustic environment. Periodically, the emitted sound signal, such as the sound masking signal, is turned off, and the ambient sound signal that is detected by the sound emitter's driver is measured. The emitted sound signal can be conditioned to make turning off the emitted sound signal less perceptible by a listener. By also using a sound emitter(s) as a sensor(s), it is not necessary to deploy separate acoustic sensors in a space, which saves costs and avoids the need to have additional devices in a room, on the ceiling, etc., or in other places in which the sound emitters are located. Among other things, the system provides the ability to deliver, to a user, sound pressure levels over time in an acoustic environment, such as a work-space, for the purpose of understanding noise levels in the acoustic environment and for potential changes to acoustic environment.

Figure 1:
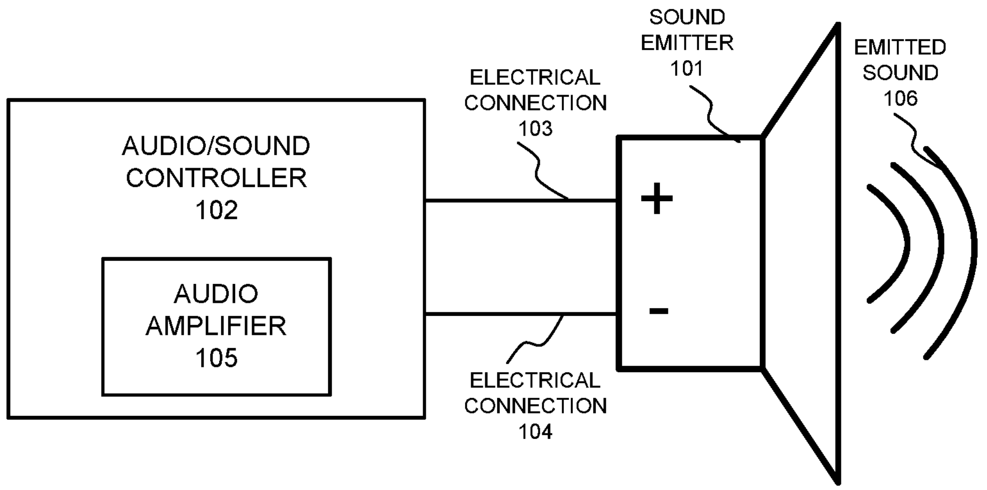
FIG. 1 is a simplified schematic diagram of a sound emitter as it is playing a sound while being driven by an audio controller that includes an amplifier, in accordance with example embodiments.

FIG. 1 is a simplified schematic diagram 100 of a sound emitter as it is playing a sound while being driven by an audio controller that includes an amplifier, in accordance with example embodiments. In FIG. 1, a sound emitter 101 comprises electrical connections 103 and 104 to receive an electrical sound emission signal from an audio/sound controller 102. For example, emitter 101 is illustrated as connected to audio controller 102 by way of a signal wire 103 and a reference wire 104. In response to the electrical sound emission signal from an audio amplifier 105 within controller 102, emitter 101 will emit a sound 106. In one aspect, sound 106 may be a masking sound directed to offsetting other sounds heard by users in the environment.

Figure 2:
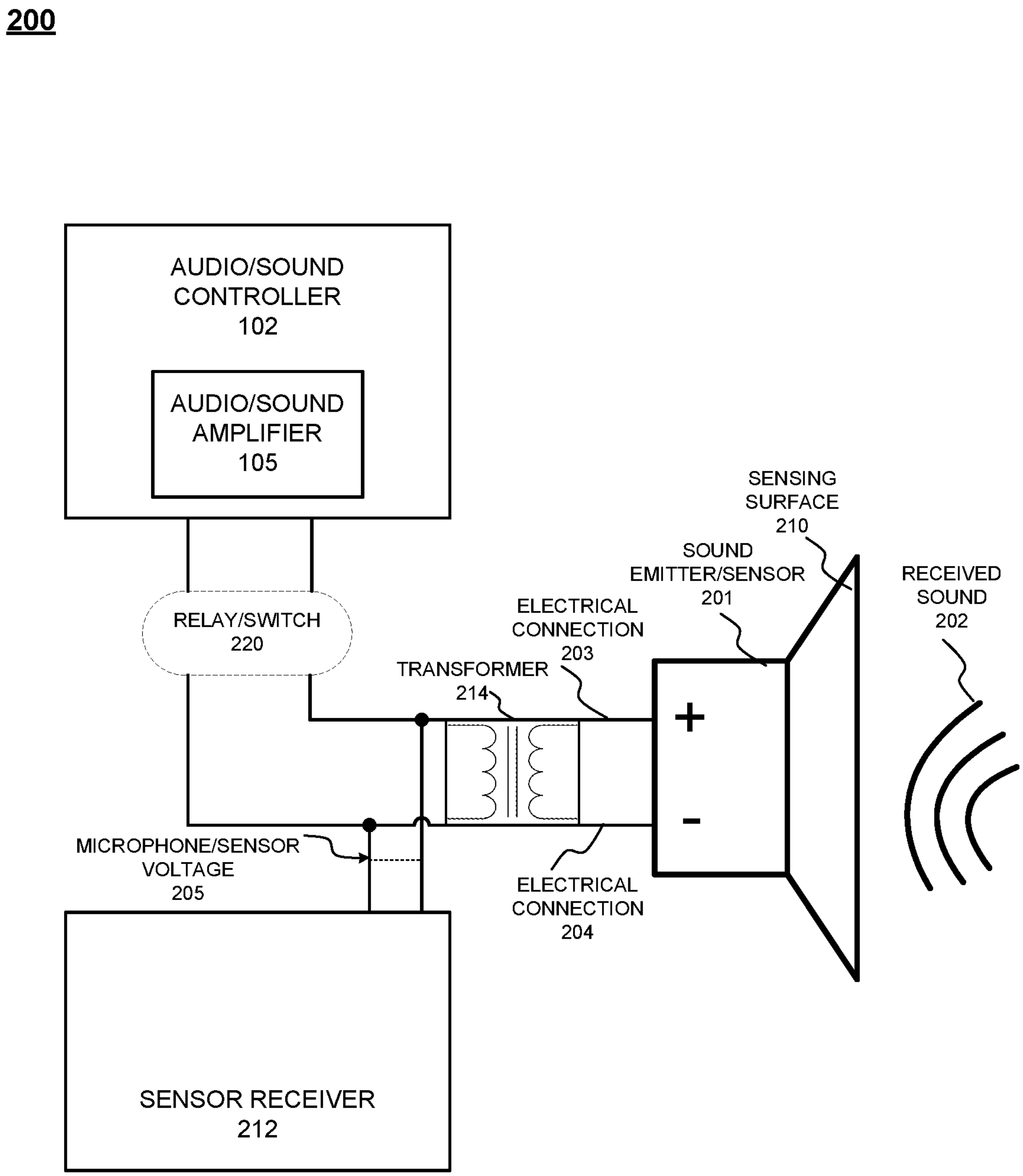
FIG. 2 is a simplified schematic diagram of a sound emitter, a switch and a sensor receiver circuit which controls the emitter as an acoustic sensor, in accordance with example embodiments.

FIG. 2 is a simplified schematic diagram 200 of a sound emitter 201 alternatively being used as an acoustic sensor, in accordance with example embodiments. The cone of emitter 201, can, for example, be a direct-field emitter facing an office or similar architectural space. That cone may also be a sensing surface 210 that becomes excited by ambient sound 202 present in that space, a voltage 205 may be generated between wires 203 and 204 connected to the terminals of emitter 201, so the detection response signal can be identified by a voltage modification circuit component, such as transformer 214. It is important to note the transformer 214 is optional and may be removed or replaced by another voltage modification circuit element. The sensed signal may be received and processed by a sensor receiver module 212 connected to the wires. The emitter circuit may also include the audio/sound controller 102 and the amplifier 105 similar to FIG. 1. However, a relay switch 220 may also be introduced to the circuit to stop the emitter 201 from receiving an emitter sound signal in periodic intervals so the sensing circuit can take over the emitter operation for sensing ambient sound. In this example, the emitter 201 is a speaker generating an emitted sound signal and in an alternative mode of operation governed by the relay/switch 220, the emitter 201 is a microphone receiving and sensing a sound as ambient noise in the environment.

Figure 3:
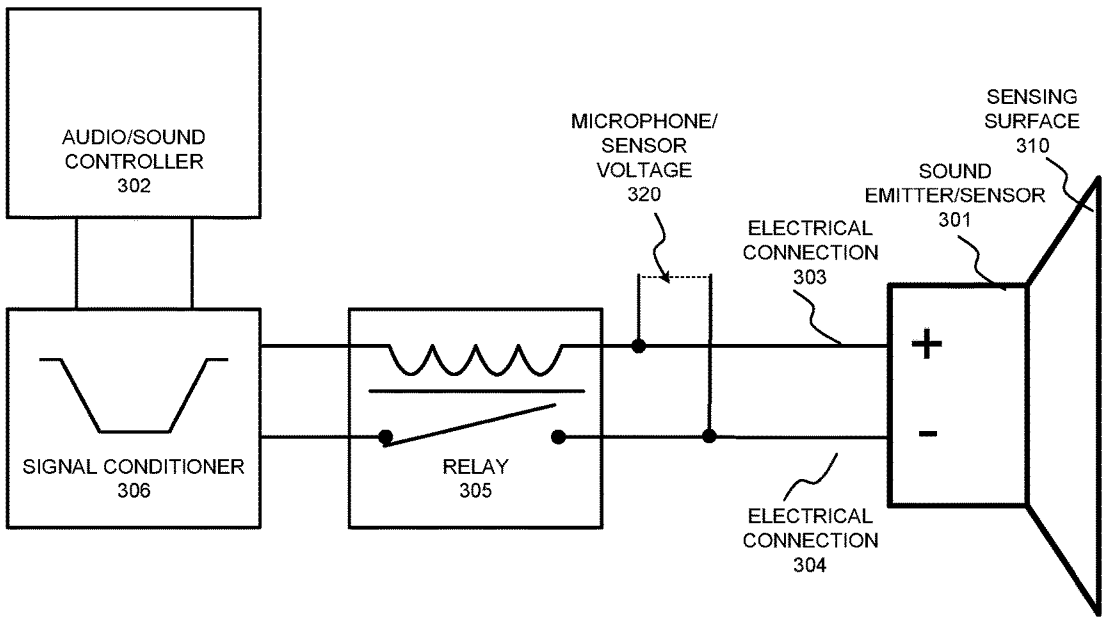
FIG. 3 is a schematic diagram illustrating a disconnection of the sound emitter from a sound source in order to enable its use as a sound sensor, in accordance with example embodiments.

FIG. 3 is a schematic diagram 300 showing the disconnection of a sound emitter from a sound source in order to enable its use as a sound sensor, in accordance with example embodiments. During playback mode, emitter 301 is driven by audio controller 302 via a signal wire 303 and a reference wire 304. When it is desired to use the same emitter 301 as a sound sensor, via its sensing surface 310, a sound emission interruption circuit, such as a relay 305, is connected and switched to interrupt reception of the electrical sound emission signal by the sound emitter. For example, relay 305 can be used to interrupt at least signal wire 303, or possibly both wires 303 and 304. Prior to disconnecting emitter 301 from controller 302 via relay 305, one may use an optional intermediate signal conditioner 306 to first ramp down the signal. The process can be reversed upon re-connection to then ramp up the signal going from controller 302 to emitter 301. It will be appreciated that, in addition to ramping up and ramping down signals, other forms of signal conditioning may be used, in order to reduce perception by listeners of the interruption of the sound signal to the emitter, and of the re-activation of the sound signal to the emitter, for example, to produce non-linear curves of the emitted sound pressure level over time. When the emitter has been disconnected, a voltage may be detected between wires 303 and 304 in response to incoming sounds, as described earlier in the context of FIG. 2. Additional wires may be in contact with the emitter wires 303 and 304 to connect the sensor voltage 320 to the emitter so sounds received by the emitter can be detected by voltage disturbances provided by the sensor voltage 320.

Figure 4:
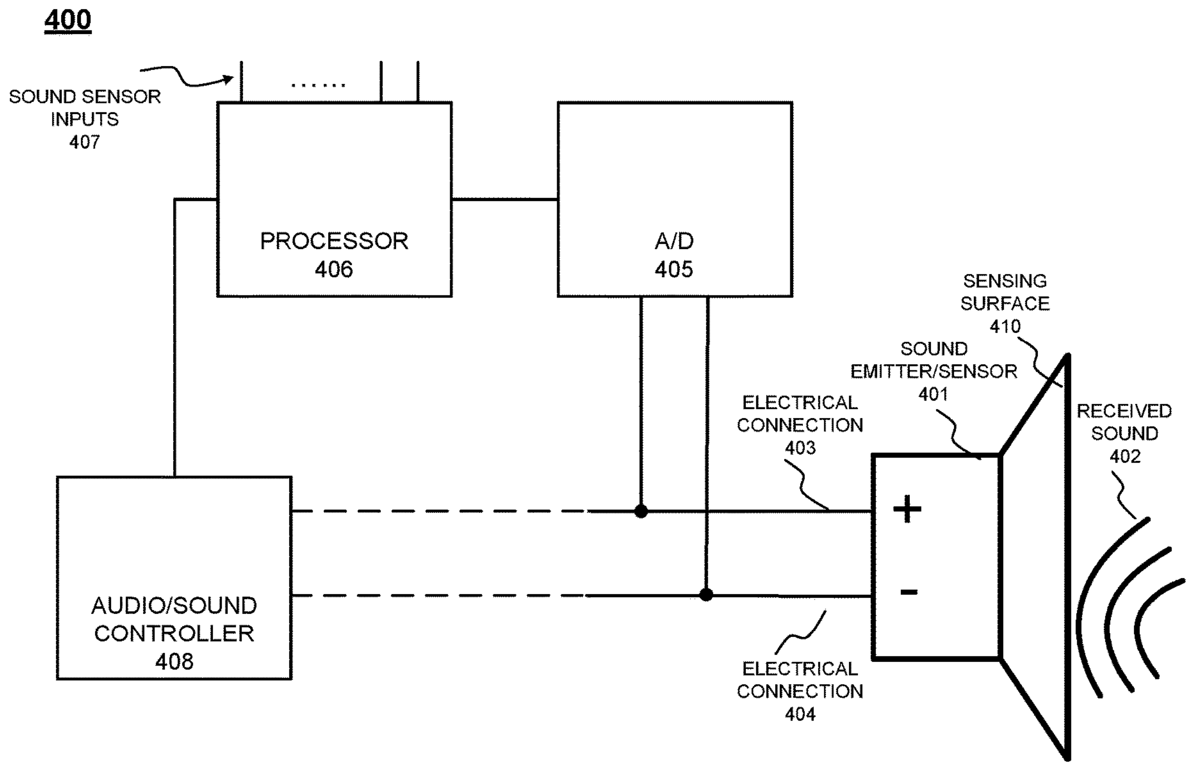
FIG. 4 is a schematic diagram illustrating the processing of the sound signal to produce a numerical reading, in accordance with example embodiments.

FIG. 4 is a schematic diagram 400 illustrating the processing of the raw sound signals to produce a numerical reading, in accordance with example embodiments. Emitter 401 has been disconnected from controller 408 as illustrated by the dotted lines and in the context of FIG. 3. Incoming sound 402 then generates a voltage between wires 403 and 404, which is digitized by the analog to digital (A/D) converter 405 before being fed to a sound detection circuit, such as processor 406. The sound detection circuit, such as processor 406, is connected to receive the electrical ambient sound signal which is based on the sounds generated by the sound emitter 401. Those ambient sounds are sensed by the sensing surface 410 of sound emitter 401 when the reception of the electrical sound emission signal is interrupted by the sound emission interruption circuit, such as relay 305 of FIG. 3. Processor 406 may receive multiple sound sensor inputs 407 and aggregate them into a combined reading signal. Processor 406 may also provide calibration, normalization, scaling and similar functions, and may further decompose the output into levels in ⅓ octave bands. In one example, audio controller 408 may receive the output of processor 406 for further processing, reporting or control functions based on the output of processor 406.

Figure 5:
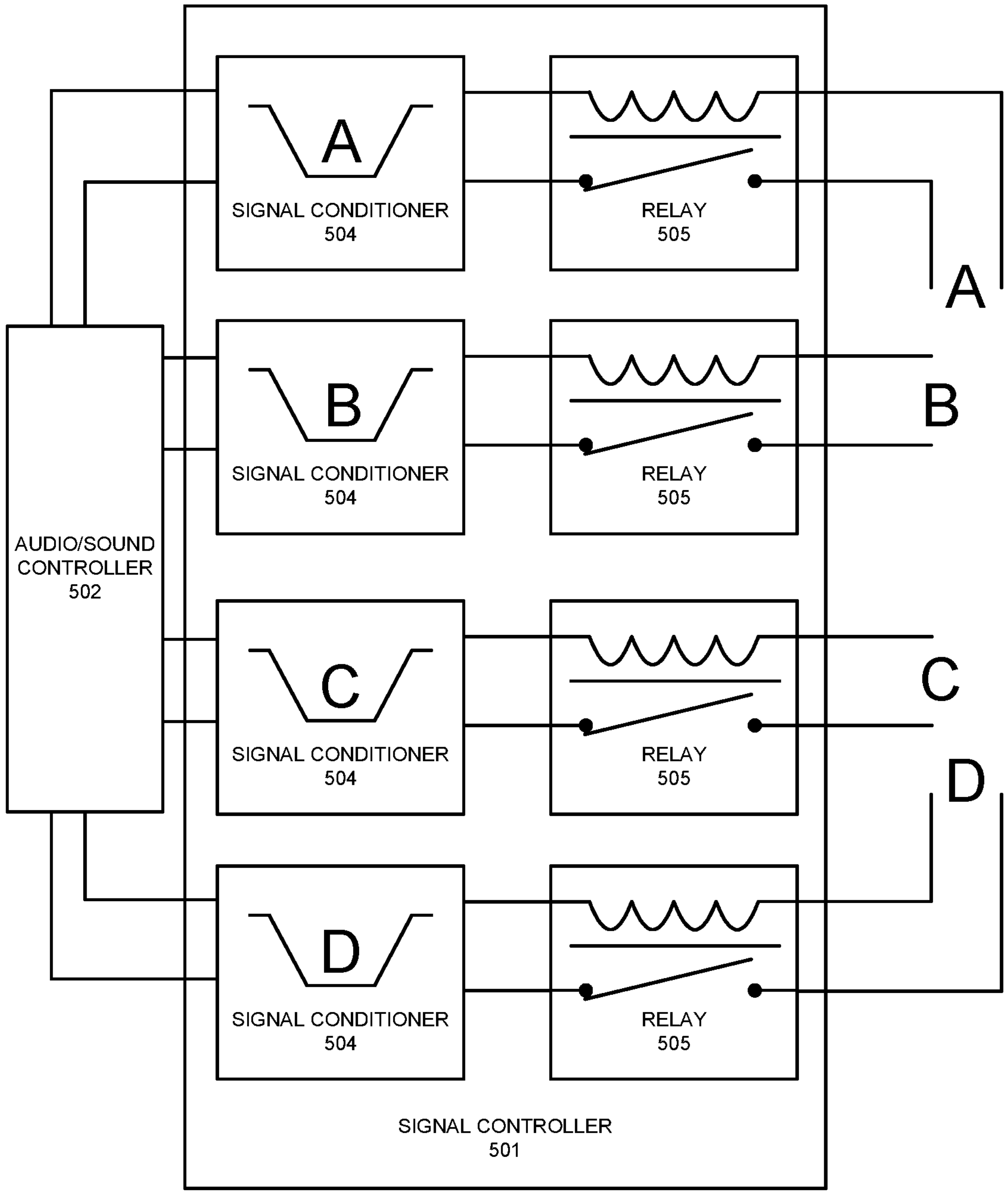
FIG. 5 is a schematic diagram illustrating the selective disconnection of an individual audio channel to enable the use of multiple emitters connected to that channel as sound sensors, in accordance with example embodiments.

FIG. 5 is a schematic diagram 500 illustrating the selective disconnection of an individual audio channel to enable the use of emitters connected to that channel as sound sensors, in accordance with example embodiments. Signal controller 501 receives multiple channels of audio signals from audio controller 502. The audio channels may be called A, B, C, D, . . . to distinguish them from one another. In one example, audio controller 502 produces four such channels, however, more or fewer channels may be created. Signal controller 501 includes one or more signal conditioners 504 capable of ramping down and ramping up any selected channel of audio A, B, C, D, . . . , etc., and one or more relays 505 to selectively disconnect any of the same audio channels. Once disconnected, the emitter of the disconnected channel can be used with sensing lines (analogous to lines 403 and 404 in FIG. 4), an analog to digital converter (analogous to A/D converter 405 of FIG. 4) and a sensing processor (analogous to processor 406 of FIG. 4) to modify any of the audio channels.

Figure 6:
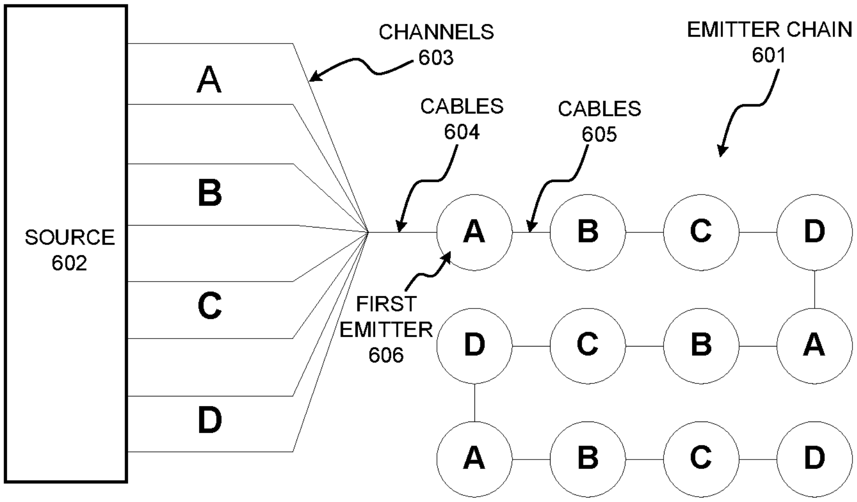
FIG. 6 is a schematic diagram depicting a chain of emitters connected to a source, such that each emitter in the series chain alternatingly play a different audio channel, in accordance with example embodiments.

FIG. 6 is a schematic diagram 600 depicting a chain of emitters 601 connected to a source 602, such that each emitter in the series alternatingly plays a different audio channel, from a collection of channels 603 that may be referenced as A, B, C, D . . . , in accordance with an aspect of the example embodiments. All channels are present in cables 604 between source 602 and the first emitter 606 in chain 601, and in cables 605 between successive emitters in the chain. In one example, cables 604 and 605 are 'Category' cables. Each emitter in chain 601 plays one of the available channels 603, and shuffles the channels prior to passing them to the next emitter via cable 605. In this manner, each successive emitter in chain 601 plays a different channel from its neighboring emitter. In one example, each emitter can be connected using readily available and inexpensive wiring with at least four pairs of conductors, such as CAT-3, 5, 5A or 6 wire. In one example, a plurality of loudspeaker assemblies are interconnected via multi-conductor American Wire Gage (AWG) No. 24 size wiring pieces. To simplify assembly, the wiring pieces are terminated at both ends with quick connect/disconnect connectors, such as RJ-45 or RJ-11 connectors, corresponding to integral input and output jacks on the loudspeakers. This eliminates any need for on-the-job cable stripping. In particular, the quick connect/disconnect connectors can be TIA/EIA-IS-968-A Registered Jack 45 (RJ-45) connectors.

Figure 7:
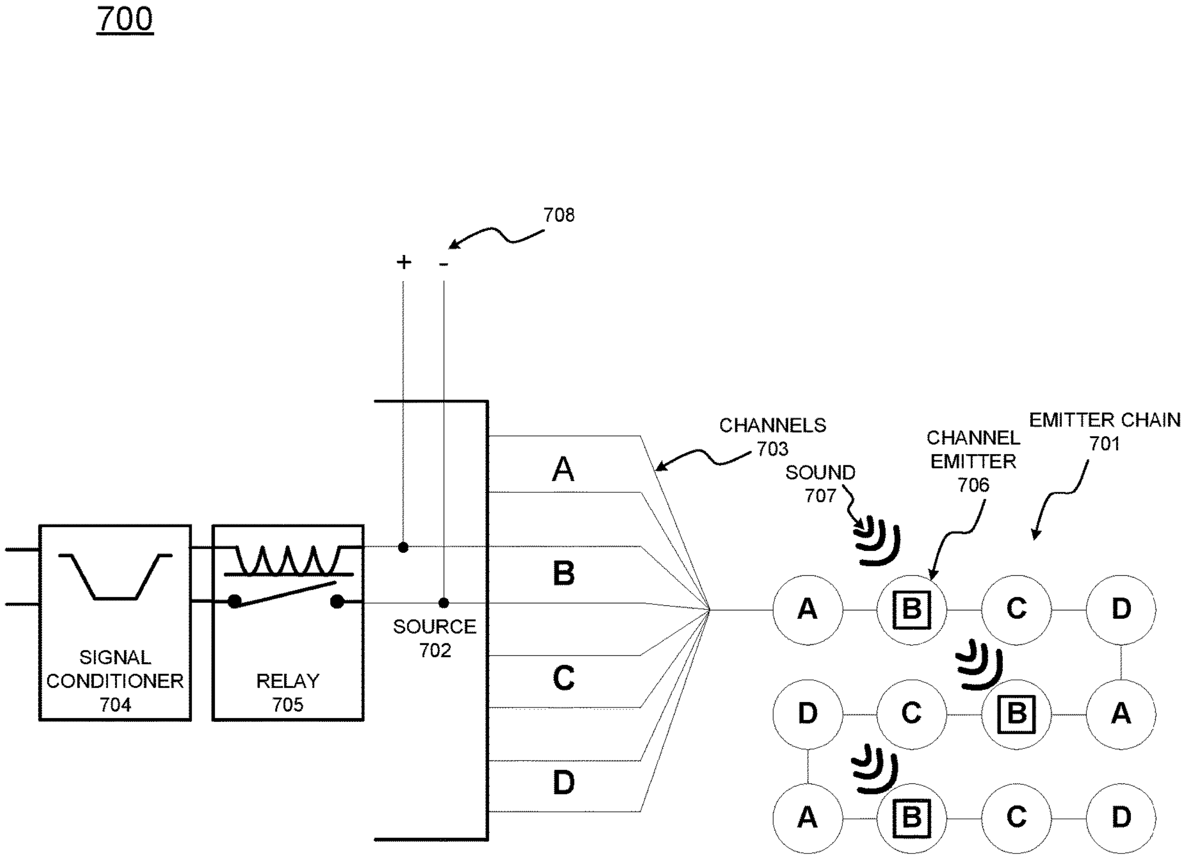
FIG. 7 is a schematic diagram illustrating the use as sound sensors of emitters connected to a selected audio channel, in accordance with example embodiments.

FIG. 7 is a schematic diagram 700 illustrating the use as sound sensors of emitters connected to a selected audio channel, in accordance with example embodiments. A chain of emitters 701 is connected to a source 702, such that each emitter in the series alternatingly plays a different audio channel from a collection of channels 703 that may be referenced as A, B, C, D, . . . , similarly to what is shown in FIG. 6. Contained within source 702 are one or more signal conditioners 704 and relays 705 that may be used to selectively disconnect an audio channel (here shown as channel B) from the audio amplifier. When this is performed, the emitter(s) 706 that are on that channel (again, shown as channel B for illustration) can be re-purposed as sound sensors that sense incoming sounds 707 and produce a voltage 708 in response to the detected sounds. When such raw voltages are processed as illustrated earlier in the context of FIG. 4, the sound readings can be stored, reported out or processed further to enable various responsive actions.

A report generated based on sensed sounds may demonstrate that sound pressure levels over time are measured using a system in accordance with an aspect of the example embodiments, and the report is generated by a reporting processor and transmitted to a computer of the system. In this example, the report may illustrate sound pressure levels in decibels (with summary labels of "poor," "good" and "excellent"), and in different areas within an acoustic environment. For example, an engineering zone and an accounting zone of a workspace may be observed, over the course of a work day. It will be appreciated that a variety of other possible reports, for example of sound pressure levels over time in an acoustic environment, can be automatically generated by a reporting processor and automatically transmitted to a computing device of the system.

Figure 8A:
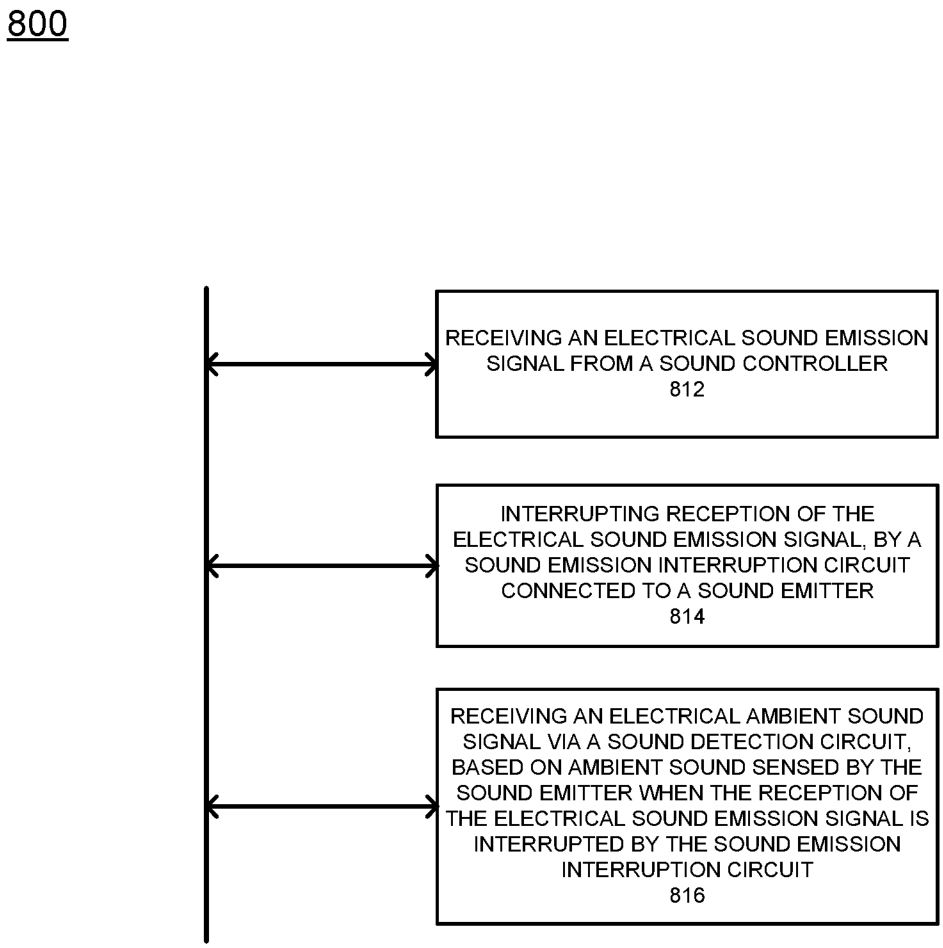
FIG. 8A is an example method of operation, in accordance with example embodiments.

FIG. 8A illustrates an example process of operating a sound emitter according to example embodiments. Referring to FIG. 8A, the process 800 includes receiving an electrical sound emission signal from a sound controller 812, interrupting reception of the electrical sound emission signal, by a sound emission interruption circuit connected to a sound emitter 814, and receiving an electrical ambient sound signal via a sound detection circuit, based on ambient sound sensed by the sound emitter when the reception of the electrical sound emission signal is interrupted by the sound emission interruption circuit 816.

The sound emitter includes a sound masking emitter, and the electrical sound emission signal includes a sound masking signal. The sound emitter is configured to emit sounds including at least one of a music signal and a paging signal, and the electrical sound emission signal includes at least one of the music signal and the paging signal. The sound detection circuit is configured to receive the electrical ambient sound signal generated by a driver of the sound emitter and based on the sensed ambient sound. The process further includes conditioning the electrical sound emission signal via a signal conditioner circuit. The signal conditioner circuit includes a ramp circuit. The sound controller is configured to emit a plurality of sound channels of the electrical sound emission signal, and the sound emission interruption circuit is configured to selectively interrupt reception by the sound emitter of a sound channel of the plurality of sound channels. The process also includes conditioning the sound channel to be selectively interrupted via a signal conditioner circuit of a plurality of signal conditioner circuits.

Figure 8B:
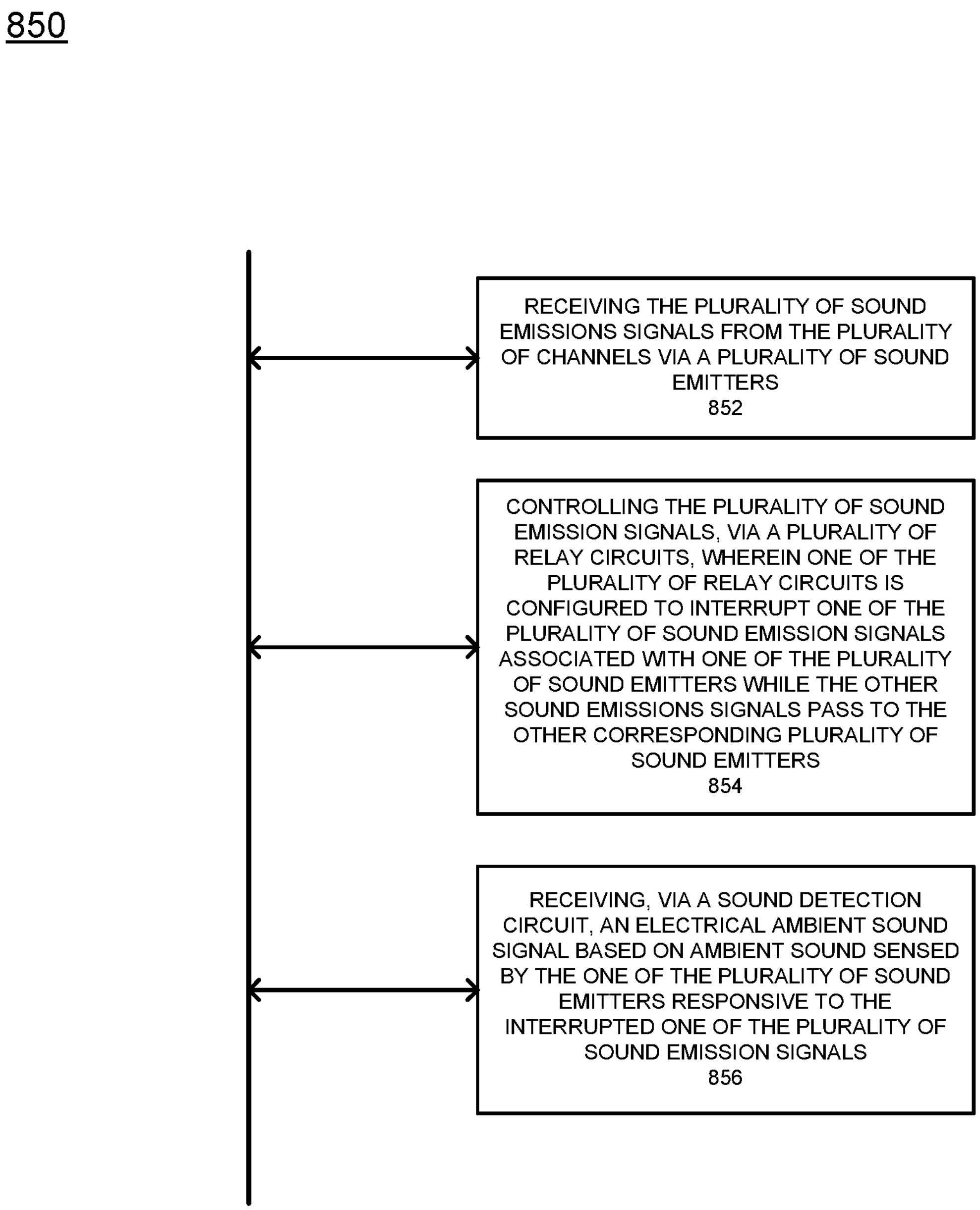
FIG. 8B is another example method of operation, in accordance with example embodiments.

FIG. 8B illustrates another example process of using a sound emitter to identify sound data. Referring to FIG. 8B, the process 850 includes receiving the plurality of sound emissions signals from the plurality of channels via a plurality of sound emitters 852, controlling the plurality of sound emission signals, via a plurality of relay circuits, and one of the plurality of relay circuits is configured to interrupt one of the plurality of sound emission signals associated with one of the plurality of sound emitters while the other sound emissions signals pass to the other corresponding plurality of sound emitters 854, and receiving, via a sound detection circuit, an electrical ambient sound signal based on ambient sound sensed by the one of the plurality of sound emitters responsive to the interrupted one of the plurality of sound emission signals 856.

In one example, the plurality of sound emitters are connected in a series chain configuration. The plurality of sound emitters are configured to receive each of the plurality of channels and each of the individual sound emitters is configured to play one of the plurality of channels, such that each of the plurality of sound emitters plays a different channel from its contiguous neighboring sound emitters in the series chain configuration. The process may also include generating the plurality of sound emission signals via a sound controller connected to a signal controller including a plurality of signal conditioners disposed in connection to the plurality of relays circuits. The interrupted one of the plurality of sound emission signals causes at least two of the sound emitters that were interrupted to detect ambient sound while the other sound emitters among the plurality of sound emitters continue emitting the sound emission signals. The at least two interrupted sound emitters are further configured to create voltages based on the detected ambient sound. The process may also include receiving, via a processor, the voltages and transmitting the voltages to a reporting computing device.

Figure 9:
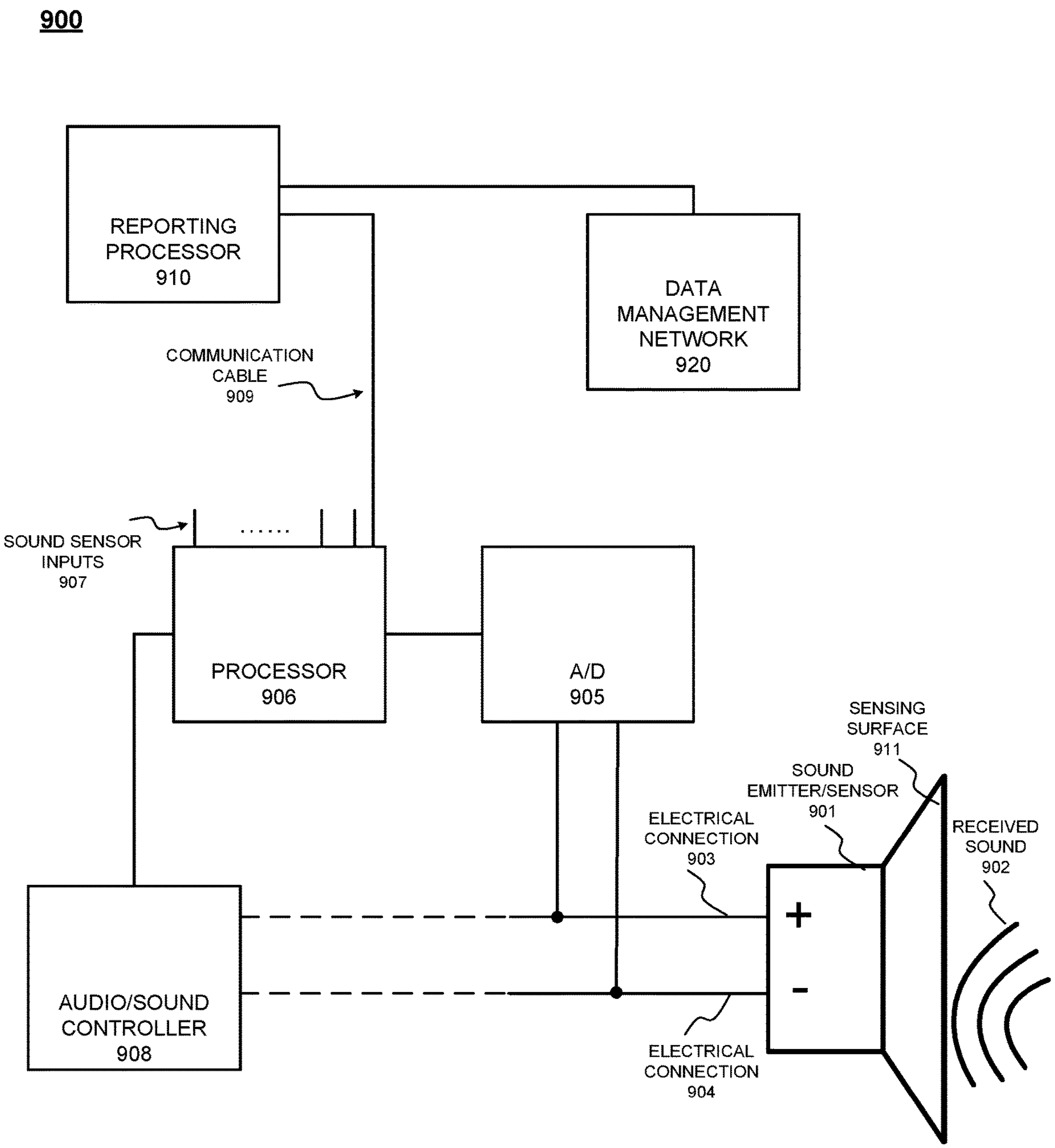
FIG. 9 is a schematic diagram illustrating operation of a reporting processor in accordance with example embodiments.

FIG. 9 is a schematic diagram 900 illustrating operation of a reporting processor 910 in accordance with example embodiments, and the reporting processor 910 can be part of the controller 908 as provided earlier in the context of FIG. 4, or a separate element. Here, the system comprises a reporting processor 910 connected via cable 909 to a sound detection circuit, such as processor 906, to electrically transmit a report of a sound pressure level in the acoustic environment over time based on the electrical ambient sound signal received by the sound detection circuit, such as processor 906. Processor 906 may receive multiple sound sensor inputs 907 and aggregate them into a combined reading signal. It will be appreciated that the electrical transmission can be over a variety of different possible electronic connections, for example, the electrical transmission can be local or remote, wired or wireless, and can for example, be sent to a cloud network or other telecommunications network 920. The sound emitter 901 can be connected to an A/D 905 for signal reception processing via connections 903 and 904. The sound can be sensed via sensing surface 911 to receive sound 902.

The reporting processor 910 can be configured to transmit the report upon the sound pressure level exceeding a sound pressure level target threshold (TSPL). The reporting processor can be configured to transmit the report based on a reporting preference, such as at least one of a system performance preference and a sound pressure level preference. Reports can, for example, be used in a variety of ways to improve decision making about acoustical needs of employees located in the work-space over time as they use the work-space. In another example, a dealer of sound masking systems can be informed of what an end user's needs are for sound masking systems. In addition, comparative reports for the same industry, based on sizes of companies, and other metrics, can be provided. Companies can be provided with a rating for high quality acoustic performance for employees, and the rating can be presented as a benefit for employees. It will be appreciated that a variety of other reports, and benefits of reports, can be provided.

Example embodiments may include an ability to sense sound pressure levels in a predetermined workspace area using a plurality of loudspeakers, such as low directivity speakers, an ability to capture sound pressure levels of multiple frequencies for storage, an ability to deliver to a user, sound pressure levels over time in a predetermined workspace for the purpose of understanding noise levels in a given space, an ability to deliver to a user, sound pressure levels over time in a predetermined work space for the purpose of changing a space to manage the noise levels for increased worker productivity and privacy.

Other example embodiments may include an ability to deliver sound masking to a predetermined space while simultaneously sensing sound pressure levels at varying time intervals, an ability to present to a user the data captured by the system in a visual form for easy human comprehension, an ability to initiate electronic messages based on preset sound pressure level targets, an ability for users to set preferences for receiving electronic notifications from the system based on system performance or sensed levels of sound pressure, and ability to use speakers in one area to help diagnose dropouts in sound playback in adjacent areas, and an ability to use speakers in one area to test speakers in adjacent areas by playing and sensing test tones.

Example embodiments may include a method of performing sound masking in the acoustic environment using a sound masking signal emitted by the sound controller while simultaneously sensing the acoustic environment using a sound emitter to which the electrical sound emission signal is interrupted. The method may include sensing a test tone generated by the sound controller and emitted in an adjacent area to the acoustic environment, while the reception of the electrical sound emission signal is interrupted. It will be appreciated that other features and advantages can be achieved in accordance with aspects of the invention.

In one example of a loudspeaker, in accordance with an example embodiment, the sound masking spectrum may include a frequency response of at least about 40 dB in the 125 Hz one-third octave band of the sound masking spectrum, such as at least about 45 dB in the 125 Hz one-third octave band of the sound masking spectrum. In addition, the sound masking spectrum can include a frequency response that falls below about 20 dB in the range of between about 4000 Hz and about 5000 Hz of the sound masking spectrum.

In another example embodiment, sound emitters can be cone loudspeakers. In another example, the sound emitters can include a low directivity index loudspeaker, such as a low directivity index cone loudspeaker. In one aspect, all of the loudspeaker assemblies in a sound masking system may be low directivity index loudspeakers. A loudspeaker assembly can have a cone emitter having an effective aperture area that is less than or equal to the area of a circle having a diameter of 3.0 inches; or that is less than or equal to the area of a circle having a diameter of 1.5 inches, or that is equal to the area of a circle having a diameter of between 1.25 inches and 3 inches; and may be of a type that is suitable to function as a direct field, low directivity index cone loudspeaker. As used herein, a "direct field" sound masking system is one in which the acoustic sound masking signal or signals, propagating in a direct audio path from one or more emitters, dominate over reflected and/or diffracted acoustic sound masking signals in the sound masking zone. A "direct audio path" is a path in which the acoustic masking signals are not reflected or diffracted by objects or surfaces and are not transmitted through acoustically absorbent surfaces within a masking area or zone.

Figure 10:
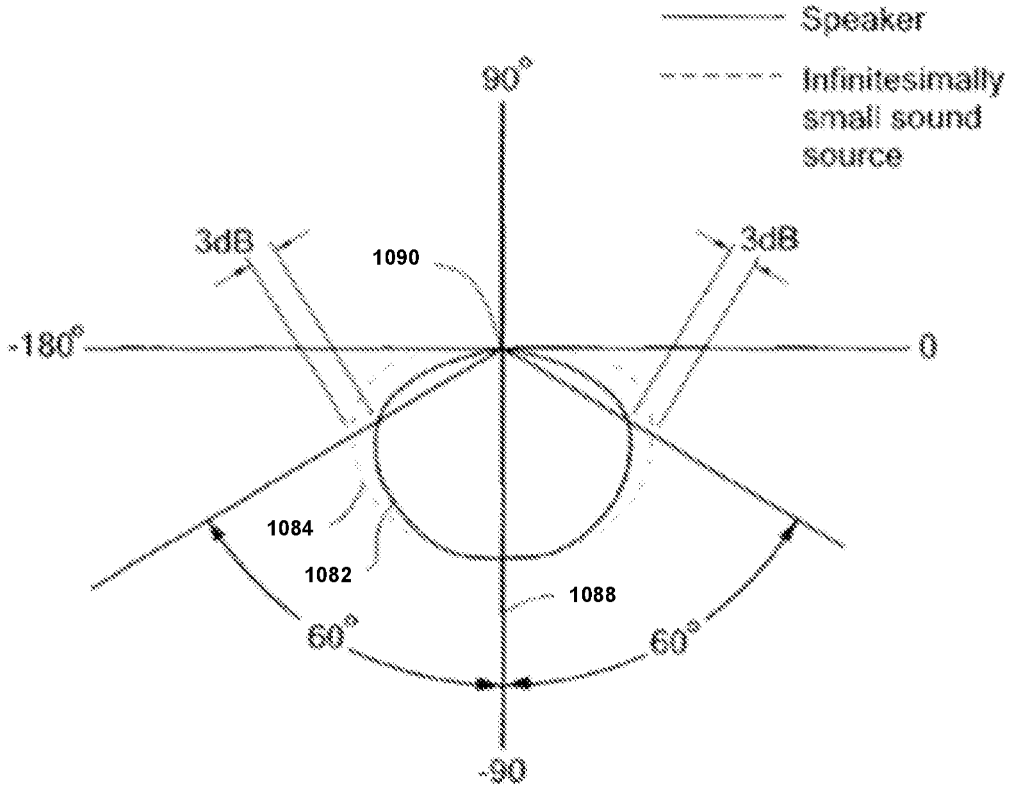
FIG. 10 is a schematic diagram illustrating a low directivity index loudspeaker pattern that can be used in accordance with example embodiments.

FIG. 10 is a schematic diagram 1000 illustrating a low directivity index loudspeaker that can be used in accordance with an aspect of the invention. A loudspeaker with a "low directivity index" is one that, with reference to the axial direction 1088 of the speaker, at location 1090 provides an output sound intensity 1082 at an angle of 20 degrees, preferably 45 degrees, and most preferably 60 degrees from the axial direction, that is not more than 3 dB, and not less than 1 dB, lower than the output sound intensity 1084 at the same angle from an infinitesimally small sound source at the same location in an infinite baffle at frequencies less than 6000 Hz, as measured in any one-third octave band. Accordingly, the low directivity index loudspeakers provide a substantially uniform acoustic output that extends nearly 180 degrees, i.e., plus or minus 90 degrees from the axial direction of the loudspeaker assembly.

In other aspects of the invention, other types of sound emitters can be used, that need not be low directivity index. Also, the sound emitters need not be cone loudspeakers, and could, for example, be flat panel sound emitters. In addition, sound systems need not be direct field, but can also involve reflection, transmission of sound through surfaces such as suspended ceilings, and reverberation.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 11 illustrates an example computer system architecture 1100, which may represent or be integrated in any of the above-described components, etc.

Figure 11:
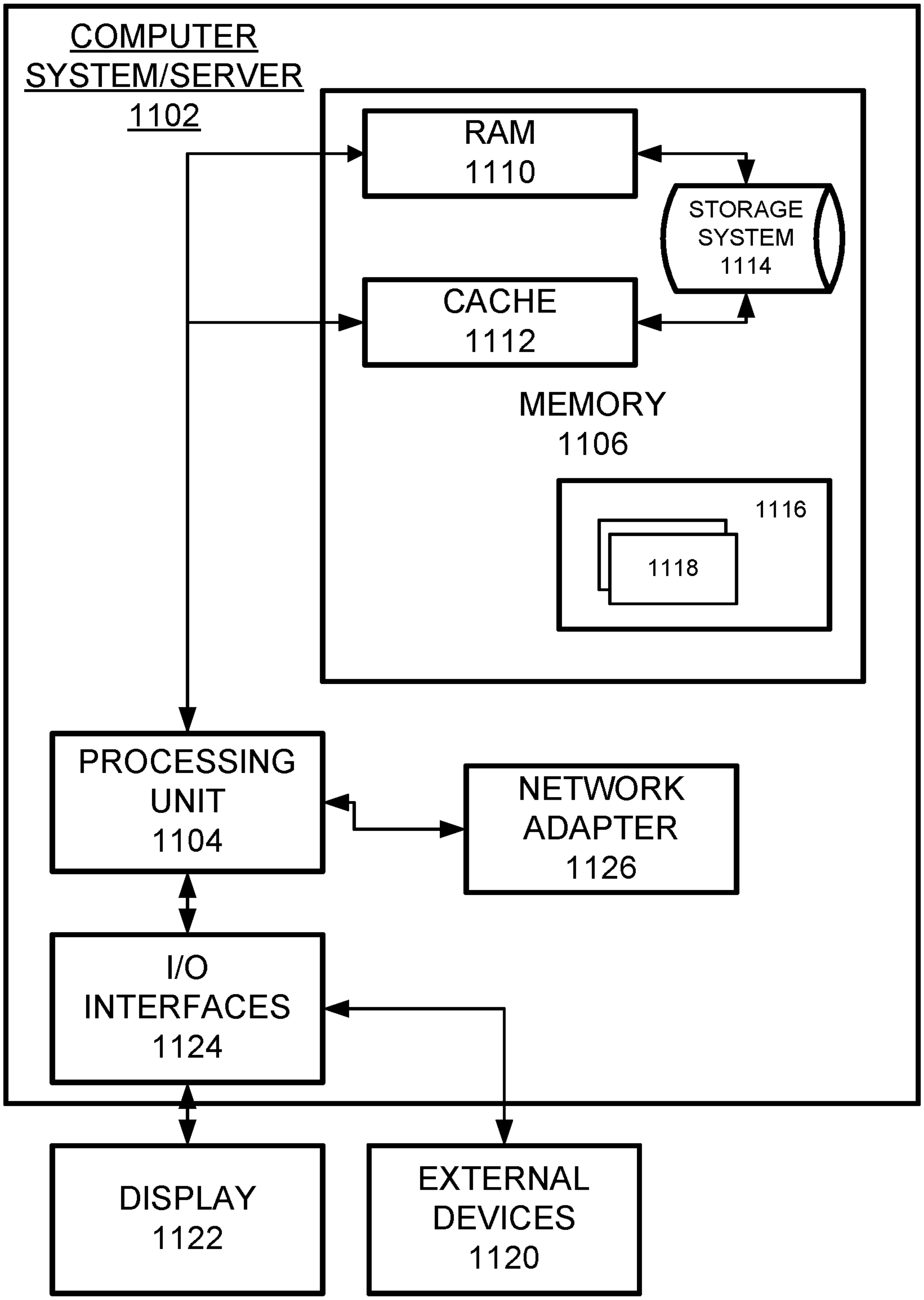
FIG. 11 illustrates a computer system/server configured to store instructions and execute operations in according with example embodiments.

FIG. 11 is not intended to suggest any limitation as to the scope of use or functionality of embodiments of the application described herein. Regardless, the computing node is capable of being implemented and/or performing any of the functionality set forth hereinabove.

In computing node 1100 there is a computer system/server 1102, which is operational with numerous other general purpose or special purpose computing system environments or configurations. Examples of well-known computing systems, environments, and/or configurations that may be suitable for use with computer system/server 1102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1102 in cloud computing node 1100 is shown in the form of a general-purpose computing device. The components of computer system/server 1102 may include, but are not limited to, one or more processors or processing units 1104, a system memory 1106, and a bus that couples various system components including system memory 1106 to processor 1104.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media. System memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may further include other removable/non-removable, volatile/non-volatile computer system storage media. By way of example only, memory 1106 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1106 may include at least one program product having a set (e.g., at least one) of program modules that are configured to carry out the functions of various embodiments of the application.

Program/utility, having a set (at least one) of program modules, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1102 may also communicate with one or more external devices via a I/O adapter 1120, such as a keyboard, a pointing device, a display, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces of the adapter 1120. Still yet, computer system/server 1102 can communicate with one or more networks such as a local area network (LAN), a general wide area network (WAN), and/or a public network (e.g., the Internet) via network adapter. As depicted, adapter 1120 communicates with the other components of computer system/server 1102 via a bus. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems 1114, etc.

Program/utility 1116, having a set (at least one) of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1102 may also communicate with one or more external devices 1120 such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces 1124. Still yet, computer system/server 1102 can communicate with one or more networks such as a local area network (LAN), a general wide area network (WAN), and/or a public network (e.g., the Internet) via network adapter 1126. As depicted, network adapter 1126 communicates with the other components of computer system/server 1102 via a bus. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

While example embodiments have been particularly shown and described, it will be understood by those skilled in the art that various changes in form and details may be made therein without departing from the scope of the embodiments encompassed by the appended claims.

What is claimed is:

1. A system comprising:

a plurality of sound emitters configured to receive a plurality of sound emissions signals from a plurality of channels, wherein one of the plurality of sound emission signals associated with one of the plurality of sound emitters is interrupted while other sound emissions signals pass to other corresponding ones of the plurality of sound emitters; and wherein the plurality of sound emitters are configured to play a different channel of the plurality of channels from contiguous neighboring ones of the plurality of sound emitters.

2. The system of claim 1, wherein the plurality of sound emitters are connected in a series chain configuration.

3. The system of claim 1, wherein a sound detection circuit is configured to receive an electrical ambient sound signal based on ambient sound sensed by the one of the plurality of sound emitters responsive to an interrupted one of the plurality of sound emission signals.

4. The system of claim 1, comprising a sound controller configured to generate the plurality of sound emission signals.

5. The system of claim 4, comprising a signal controller connected to the sound controller and comprising a plurality of signal conditioners disposed in connection to a plurality of relay circuits.

6. The system of claim 1, wherein the one of an interrupted sound emitter of the plurality of interrupted sound emitters is further configured to create voltages based on the ambient sound.

7. The system of claim 6, comprising a processor configured to receive the voltages and transmit the voltages to a reporting computing device.

8. A method comprising:

receiving, via a plurality of sound emitters, a plurality of sound emissions signals from a plurality of channels, wherein one of the plurality of sound emission signals associated with one of the plurality of sound emitters is interrupted while other sound emissions signals pass to other corresponding ones of the plurality of sound emitters; and playing, via the plurality of sound emitters, a different channel of the plurality of channels from contiguous neighboring ones of the plurality of sound emitters.

9. The method of claim 8, wherein the plurality of sound emitters are connected in a series chain configuration.

10. The method of claim 8, comprising receiving, via a sound detection circuit, an electrical ambient sound signal based on ambient sound sensed by the one of the plurality of sound emitters responsive to an interrupted one of the plurality of sound emission signals.

11. The method of claim 8, comprising generating the plurality of sound emission signals via a sound controller connected to a signal controller.

12. The method of claim 11, wherein the signal controller comprises a plurality of signal conditioners disposed in connection to a plurality of relays circuits.

13. The method of claim 8, wherein the one of an interrupted sound emitters is further configured to create voltages based on an ambient sound.

14. The method of claim 13, comprising receiving, via a processor, the voltages; and transmitting the voltages to a reporting computing device.

15. A non-transitory computer readable storage medium configured to store instructions that when executed cause a processor to perform:

receiving, via a plurality of sound emitters, a plurality of sound emissions signals from a plurality of channels, wherein one of the plurality of sound emission signals associated with one of the plurality of sound emitters is interrupted while other sound emissions signals pass to other corresponding ones of the plurality of sound emitters; and playing, via the plurality of sound emitters, a different channel of the plurality of channels from contiguous neighboring ones of the plurality of sound emitters.

16. The non-transitory computer readable storage medium of claim 15, wherein the plurality of sound emitters are connected in a series chain configuration.

17. The non-transitory computer readable storage medium of claim 15, wherein a sound detection circuit is configured to receive an electrical ambient sound signal based on ambient sound sensed by the one of the plurality of sound emitters responsive to an interrupted one of the plurality of sound emission signals.

18. The non-transitory computer readable storage medium of claim 15, wherein the processor is further configured to perform:

generating the plurality of sound emission signals via a sound controller connected to a signal controller.

19. The non-transitory computer readable storage medium of claim 18, wherein the signal controller comprises a plurality of signal conditioners disposed in connection to a plurality of relays circuits.

20. The non-transitory computer readable storage medium of claim 15, wherein the one of an interrupted sound emitters is further configured to create voltages based on an ambient sound.

* * * * *